(12) United States Patent
Tachibana (10) Patent No.: US 11,746,028 B2
(45) Date of Patent: Sep. 5, 2023

(54) HYDROGEN GAS DISSOLVING APPARATUS

(71) Applicant: NIHON TRIM CO., LTD., Osaka (JP)

(72) Inventor: Takahito Tachibana, Nankoku (JP)

(73) Assignee: NIHON TRIM CO., LTD., Osaka (JP)

( * ) Notice: Subject to any disclaimer, the term of this patent is extended or adjusted under 35 U.S.C. 154(b) by 232 days.

(21) Appl. No.: 17/254,177

(22) PCT Filed: Jul. 23, 2019

(86) PCT No.: PCT/JP2019/028764
§ 371 (c)(1),
(2) Date: Dec. 18, 2020

(87) PCT Pub. No.: WO2020/022307
PCT Pub. Date: Jan. 30, 2020

(65) Prior Publication Data
US 2021/0269335 A1      Sep. 2, 2021

(30) Foreign Application Priority Data
Jul. 25, 2018   (JP) ................. 2018-139713

(51) Int. Cl.
*B01D 53/22* (2006.01)
*C02F 1/68* (2023.01)
(Continued)

(52) U.S. Cl.
CPC ............. *C02F 1/685* (2013.01); *B01D 53/22* (2013.01); *B01F 23/2312* (2022.01);
(Continued)

(58) Field of Classification Search
CPC .......................... B01D 53/22; B01D 53/228
See application file for complete search history.

(56) References Cited

U.S. PATENT DOCUMENTS

| 4,268,279 A | 5/1981 | Shindo et al. |
| 2012/0048383 A1 | 3/2012 | Hiroto et al. |
| 2017/0043305 A1 | 2/2017 | Igarashi |

FOREIGN PATENT DOCUMENTS

| EP | 3366368 A1 | 8/2018 |
| JP | S55-001816 A | 1/1980 |

(Continued)

OTHER PUBLICATIONS

The extended European search report of the corresponding EP application No. 19840716.5 dated Feb. 3, 2022.

*Primary Examiner* — Robert A Hopkins
(74) *Attorney, Agent, or Firm* — Muncy, Geissler, Olds & Lowe, P.C.

(57) ABSTRACT

A hydrogen gas dissolving apparatus 1 has a hydrogen supply unit 2 capable of supplying hydrogen gas, and a hydrogen gas dissolution module 6 for bringing the hydrogen gas supplied from the hydrogen supply unit 2 in contact with and dissolved in water. The hydrogen gas dissolution module 6 has a supply port 62 to which the hydrogen gas is supplied, a hydrogen chamber 63 communicating with the supply port 62 and filled with the hydrogen gas supplied from the supply port 62, and an exhaust port 64 communicating with the hydrogen chamber 63 and discharging the air in the hydrogen chamber 63. The exhaust port 64 is located in a lower part of the hydrogen chamber 63.

7 Claims, 6 Drawing Sheets

(51) Int. Cl.
  B01F 23/231  (2022.01)
  B01F 23/236  (2022.01)
  B01F 35/71   (2022.01)
  *C02F 103/02*    (2006.01)
  *B01F 23/237*    (2022.01)
  *B01F 101/48*    (2022.01)

(52) U.S. Cl.
  CPC ........ B01F 23/2363 (2022.01); B01F 35/712 (2022.01); *B01F 23/23764* (2022.01); *B01F 23/231244* (2022.01); *B01F 2101/48* (2022.01); *C02F 2103/02* (2013.01)

(56) References Cited

FOREIGN PATENT DOCUMENTS

| | | | | |
|---|---|---|---|---|
| JP | 63258605 | A | * 10/1988 | ......... B01D 19/0031 |
| JP | 2003-340451 | A | 12/2003 | |
| JP | 2007319843 | A | 12/2007 | |
| JP | 2016077987 | A | 5/2016 | |
| KR | 19990007226 | A | * 1/1999 | |
| WO | 2017069219 | A1 | 10/2017 | |

* cited by examiner

HYDROGEN GAS DISSOLVING APPARATUS

BACKGROUND TECHNOLOGY

The present invention relates to a hydrogen gas dissolving apparatus for making hydrogen gas dissolved in water.

In recent years, a hydrogen gas dissolving apparatus has been proposed in which hydrogen gas is dissolved in tap water to produce hydrogen water. For example, Patent Document 1 discloses an apparatus for producing hydrogen water by supplying hydrogen gas and tap water through a gas separation hollow fiber membrane. The above-mentioned Patent Document 1 describes that it is possible to supply hydrogen water having a concentration higher than a predetermined concentration by adjusting the pressure of the hydrogen gas in accordance with the water temperature and by making the pressure of the hydrogen gas and the pressure of the tap water the same pressure.

By the way, in the above-said hydrogen gas dissolving apparatus, the inside of the hydrogen gas dissolving means (outside of the gas separation hollow fiber membrane) before the hydrogen gas is supplied from the hydrogen gas supplying means, is filled with air. This air remains in the hydrogen gas dissolving means even after the supply of hydrogen gas is started, and prevents the hydrogen molecules from coming into contact with the gas separation hollow fiber membrane. Therefore, it becomes difficult to rapidly and sufficiently increase the dissolved hydrogen concentration in the hydrogen water, and further improvement is desired.

PRIOR ART DOCUMENT

Patent Document

Patent Document 1: Patent Application Publication No. 2016-77987

SUMMARY OF THE INVENTION

Problems to be Solved by the Invention

The present invention has been devised in view of the above circumstances, and a primary objective is to provide a hydrogen gas dissolving apparatus capable of rapidly and sufficiently increasing the dissolved hydrogen concentration in the hydrogen water.

Means for Solving the Problems

The present invention is a hydrogen gas dissolving apparatus which has
a hydrogen supply unit capable of supplying hydrogen gas, and
a hydrogen gas dissolution module for making the hydrogen gas supplied from the hydrogen supply unit being contact with and dissolved in water,
wherein
the hydrogen gas dissolution module has
a supply port to which the hydrogen gas is supplied,
a hydrogen chamber filled with the hydrogen gas supplied from the supply port, and
an exhaust port communicating with the hydrogen chamber and discharging air in the hydrogen chamber, and
the exhaust port is located in a lower part of the hydrogen chamber.

In the hydrogen gas dissolving apparatus, it is preferable that
an open/close valve is provided below the exhaust port.

It is desirable that the hydrogen gas dissolving apparatus further comprises
a control unit for controlling the open/close valve according to the supply amount of the hydrogen gas.

In the hydrogen gas dissolving apparatus, it is preferable that
the hydrogen supply unit pressurizes the hydrogen chamber by continuing to supply the hydrogen gas after the open/close valve is closed.

In the hydrogen gas dissolving apparatus, it is preferable that
the supply port is located above the exhaust port.

In the hydrogen gas dissolving apparatus, it is preferable that
the hydrogen gas dissolution module has a plurality of tube bodies for passing the water, and the tube bodies are composed of a porous membrane which allows the hydrogen gas to permeate.

In the hydrogen gas dissolving apparatus, it is preferable that
the tube bodies are arranged in a direction intersecting the traveling direction of the hydrogen gas supplied from the supply port to the hydrogen chamber.

In the hydrogen gas dissolving apparatus, it is preferable that
the porous membrane is a hollow fiber membrane.

Effect of the Invention

As already described, the hydrogen chamber is filled with air before the hydrogen gas is supplied.

In the hydrogen chamber, with the supply of the hydrogen gas, the hydrogen gas having a density lower than that of air is distributed upward, and the air is pushed down by the hydrogen gas and moves downward.

In the present invention, since the exhaust port is provided in the lower part of the hydrogen chamber, the air pushed down by the hydrogen gas is smoothly discharged through the exhaust port.

As a result, the air in the hydrogen chamber is quickly discharged, and the dissolved hydrogen concentration can be raised quickly and sufficiently.

MODE FOR CARRYING OUT THE INVENTION

Hereinafter, an embodiment of the present invention will be described with reference to the drawings.

Figure 1:
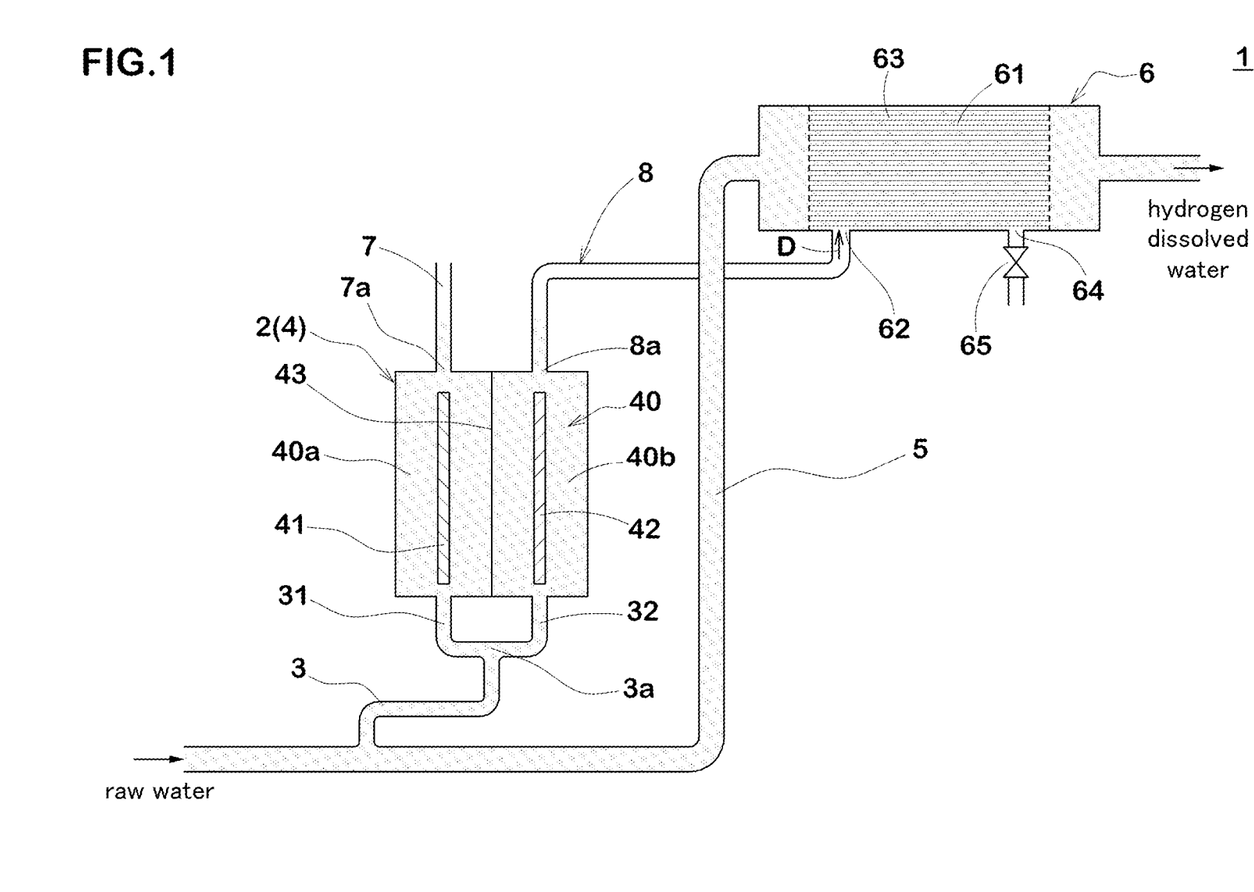
FIG. 1 a diagram showing a schematic configuration of an embodiment of the hydrogen gas dissolving apparatus of the present invention.

FIG. 1 shows a schematic configuration of the hydrogen gas dissolving apparatus 1 of the present embodiment.
In the figure, the hatched area is an area filled with water (hereinafter, the same applies to FIGS. 4 to 6).
The hydrogen gas dissolving apparatus 1 is equipped with a hydrogen supply unit 2 and a hydrogen gas dissolution module 6.

The hydrogen supply unit 2 is configured to be able to supply hydrogen gas to the hydrogen gas dissolution module 6. The hydrogen supply unit 2 of the present embodiment includes an electrolysis tank 4.

In the electrolysis tank 4, hydrogen gas is generated by electrolysis.
The hydrogen gas dissolution module 6 dissolves the hydrogen gas supplied from the electrolysis tank 4 by bringing it into contact with water.
Thereby, with a simple structure, it becomes possible to produce hydrogen dissolved water which is available in hemodialysis and as drinking water,
In the inside of the electrolysis tank 4, an electrolysis chamber 40 is formed.
In the electrolysis chamber 40, there are disposed an anode feed body 41, a cathode feed body 42, and a diaphragm 43. By the diaphragm 43, the electrolysis chamber 40 is divided into an anode chamber 40a on the anode feed body 41 side, and a cathode chamber 40b on the cathode feed body 42 side.

For the diaphragm 43, for example, a solid polymer material made of a fluororesin having a sulfonic acid group or the like is appropriately used.
In order to make the electrolysis efficiently in the inside of the electrolysis tank 4, it is preferred that the electrolysis chamber 40 is separated by the diaphragm 43 into the anode chamber 40a and the cathode chamber 40b.

Water for electrolysis is supplied to the anode chamber 40a and the cathode chamber 40b.
When a direct current voltage for electrolysis is applied between the anode feed body 41 and the cathode feed body 42, the water is electrolyzed in the anode chamber 40a and the cathode chamber 40b, generating oxygen gas in the anode chamber 40a and hydrogen gas in the cathode chamber 40b.

Figure 2:
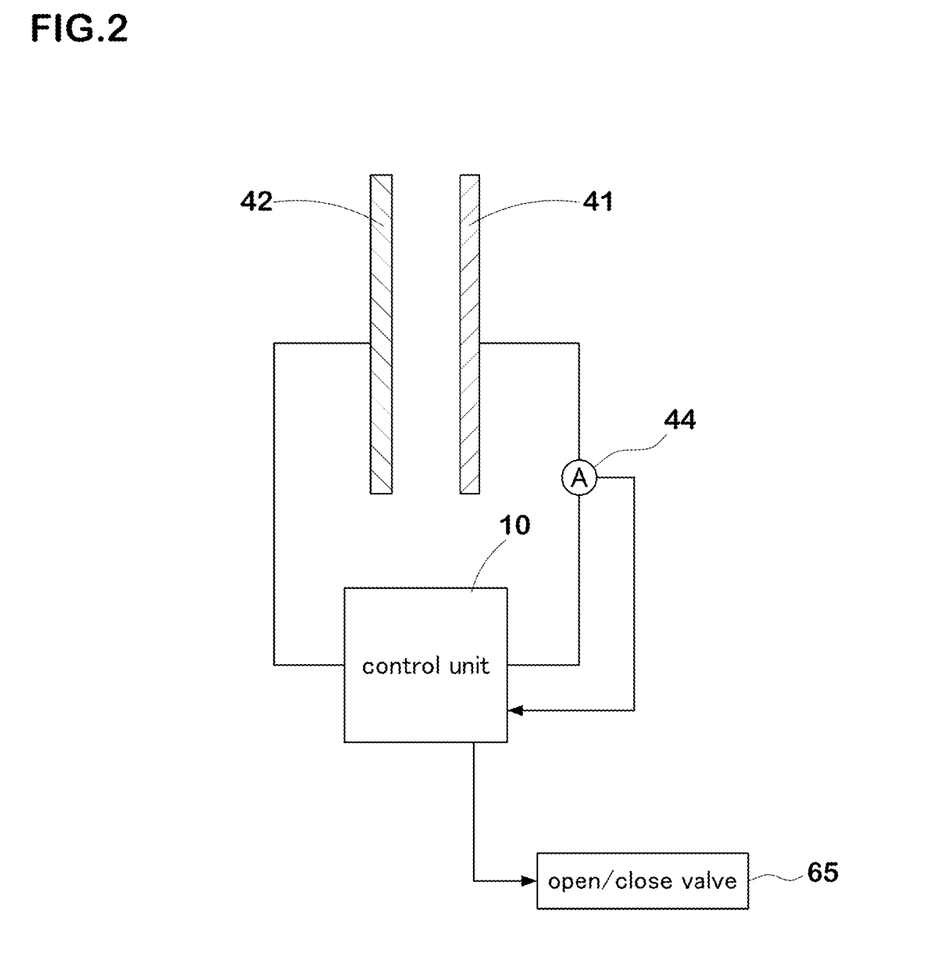
FIG. 2 a block diagram showing an electrical configuration of the hydrogen gas dissolving apparatus.

FIG. 2 shows an electrical configuration of the hydrogen gas dissolving apparatus 1.
The hydrogen gas dissolving apparatus 1 is equipped with a control unit 10 which controls each of the anode feed body 41, the cathode feed body 42 and other parts.

The control unit 10 has, for example, a CPU (Central Processing Unit) for executing various arithmetic processes, information processing, and the like, and
a memory for storing programs and various information for controlling the operation of the CPU.
A current supply line between the anode feed body 41 and the control unit 10 is provided with a current sensing means 44.
The current sensing means 44 may be provided in a current supply line between the cathode feed body 42 and the control unit 10.

The current sensing means 44 detects the electrolysis current supplied to the anode feed body 41 and the cathode feed body 42, and outputs an electrical signal corresponding to the value of the electrolysis current, to the control unit 10.

The control unit 10 feedback-controls the DC voltage applied to the anode feed body 41 and the cathode feed body 42, for example, based on the electric signal output from the current sensing means 44.

For example, when the electrolysis current is excessive, the control unit 10 reduces the voltage, and when the electrolysis current is too small, the control unit 10 increases the voltage.

Thereby, the electrolysis current supplied to the anode feed body 41 and the cathode feed body 42 is appropriately controlled.

Further, the control unit 10 time-integrates the electrolysis current and thereby calculates the amount of hydrogen gas generated.

As shown in FIG. 1, in the present embodiment, the water supply pipe 3 for supplying water for electrolysis to the anode chamber 40a and the cathode chamber 40b is further provided.
The water supply pipe 3 is branched into the water supply pipe 31 and the water supply pipe 32 at a bifurcation portion 3a.

The water supply pipe 31 is connected to the anode chamber 40a, and the water supply pipe 32 is connected to the cathode chamber 40b. The water supply pipe 3 upstream of the bifurcation portion 3a may be appropriately provided with an open/close valve.

The hydrogen gas dissolving apparatus 1 is further provided with a water supply means for supplying water to the hydrogen gas dissolution module 6.
The water supply means comprises a water supply pipe 5.
In the present embodiment, the water supply pipe 3 is branched from the water supply pipe 5.
Accordingly, the water supply pipe 3 and the water supply pipe 5 are supplied with water from a water source of the same system.
Thereby, the structure of the hydrogen gas dissolving apparatus 1 is simplified.
It may be also possible that the water source of the water supply pipe 3 and the water source of the water supply pipe 5 are separate systems.

The hydrogen supply unit 2 is not limited to the above described electrolysis tank 4, and it may be any one that is at least capable of supplying hydrogen gas. For example, it may be a hydrogen cylinder or the like filled with hydrogen gas in advance.

The hydrogen gas dissolution module 6 brings the hydrogen gas supplied from the hydrogen supply unit 2 into contact with the water supplied from the water supply pipe 5 and dissolves the hydrogen gas in the water.

When the hydrogen dissolved water produced by the hydrogen gas dissolving apparatus 1 is used for hemodialysis, reverse osmosis water treated by a reverse osmosis membrane treatment device (not shown) is supplied to the water supply pipe 5. Then, by the hydrogen gas dissolution module 6, hydrogen gas is dissolved in the reverse osmosis water, and dialysate preparation water is produced and supplied to a dialysate supply device.

The hydrogen gas dissolution module 6 has a tube body 61 for passing water supplied from the water supply pipe 5. In this embodiment, a plurality of the tube bodies 61 are disposed inside the hydrogen gas dissolution module 6.
The tube bodies 61 extend in a horizontal direction.

That is, the hydrogen gas dissolution module 6 has a horizontal-mount type structure.

The tube body 61 is composed of a porous membrane which is hydrogen gas permeable.

In the present embodiment, a hollow fiber membrane is used as the porous membrane constituting the tube body 61.

The hollow fiber membrane has innumerable micropores which allow hydrogen gas to pass through.

Thereby, the hydrogen gas supplied from the hydrogen supply unit 2 permeates the tube body 61, and comes into contact with and dissolved in the water existing in the tube body 61, and hydrogen water in which hydrogen is dissolved is produced.

The hydrogen gas dissolution module 6 has
a supply port 62 to which hydrogen gas is supplied,
a hydrogen chamber 63 filled with hydrogen gas supplied from the supply port 62, and
an exhaust port 64 for discharging air in the hydrogen chamber 63.

The hydrogen supply unit 2 and the supply port 62 are connected to each other via a hydrogen supply pipe 8.

The supply port 62 and the exhaust port 64 communicate with the hydrogen chamber 63.

In the hydrogen gas dissolution module 6, the supply port 62 and the exhaust port 64 are located at the same height.

The hydrogen chamber 63 before the hydrogen gas is supplied from the supply port 62 is filled with air.

In the present embodiment, since the hydrogen gas dissolution module 6 is provided with the exhaust port 64, the air in the hydrogen chamber 63 is discharged through the exhaust port 64, and only the hydrogen gas can be filled in the hydrogen chamber 63. Therefore, it is possible to quickly and sufficiently increase the dissolved hydrogen concentration of the hydrogen water produced by the hydrogen gas dissolution module 6.

In the hydrogen gas dissolution module 6 of the hydrogen gas dissolving apparatus 1, the exhaust port 64 is provided in a lower part of the hydrogen chamber 63.

Being provided at a lower part of the hydrogen chamber 63 means that it is located at least below the center of the hydrogen chamber 63 in the height direction.

It is desirable that the exhaust port 64 is located below the tube body 61. In the present embodiment, the exhaust port 64 is located at the lowermost part of the hydrogen chamber 63.

By the way, under the same pressure, the density (molecular weight) of hydrogen gas is smaller than the density of air. Therefore, with the supply of hydrogen gas, hydrogen gas having the density lower than that of air is distributed upward in the hydrogen chamber 63, and the air is pushed down by the hydrogen gas and moves downward.

In the present invention, since the exhaust port 64 is provided in the lower part of the hydrogen chamber 63, the air pushed down by the hydrogen gas is smoothly discharged through the exhaust port 64. As a result, the air in the hydrogen chamber 63 is quickly discharged, and the dissolved hydrogen concentration can be quickly increased.

The tube bodies 61 are arranged so as to intersect the traveling direction D of the hydrogen gas supplied from the supply port 62 to the hydrogen chamber 63.

In the hydrogen gas dissolution module 6, the tube bodies 61 are arranged in a direction orthogonal to the traveling direction D of the hydrogen gas supplied from the supply port 62 to the hydrogen chamber 63.

By setting the positional relationship between the supply port 62 and the tube bodies 61 as described above, it becomes easier for hydrogen molecules to enter the inside of the tube bodies 61 through the above-said micropores when the hydrogen gas flowing into the hydrogen chamber 63 from the supply port 62 collides with the tube bodies 61, and the permeation of the hydrogen gas is promoted.

An open/close valve 65 is provided below the exhaust port 64.

The air in the hydrogen chamber 63 is discharged to the outside of the hydrogen gas dissolution module 6 from the exhaust port 64 through the open/close valve 65.

After the air is discharged from the hydrogen chamber 63, the open/close valve 65 is closed in order to prevent the hydrogen gas from flowing out through the exhaust port 64. As a result, the pressure of the hydrogen gas in the hydrogen chamber 63 rises, and the dissolved hydrogen concentration of the hydrogen water is increased.

As the open/close valve 65, for example, a solenoid valve which opens and closes using an electromagnetic force as a driving force is employed.

The open/close valve 65 is controlled by the control unit 10.

The control unit 10 controls the open/close valve 65 according to the amount of hydrogen gas supplied to the hydrogen chamber 63.

The control unit 10 acquires the amount of the supplied hydrogen gas based on, for example, the amount of supply time of the hydrogen gas by the hydrogen supply unit 2.

When the hydrogen supply unit 2 is constituted by the electrolysis tank 4, the amount of hydrogen gas supplied is calculated based on the time integral value of the electrolysis current supplied to the anode feed body 41 and the cathode feed body 42.

Further, the control unit 10 may be configured to acquire the amount of the hydrogen gas supplied to the hydrogen chamber 63 by controlling a mass flow controller (not shown) provided in the hydrogen supply pipe 8, and to control the open/close valve 65 according to the acquired amount.

Figure 3:
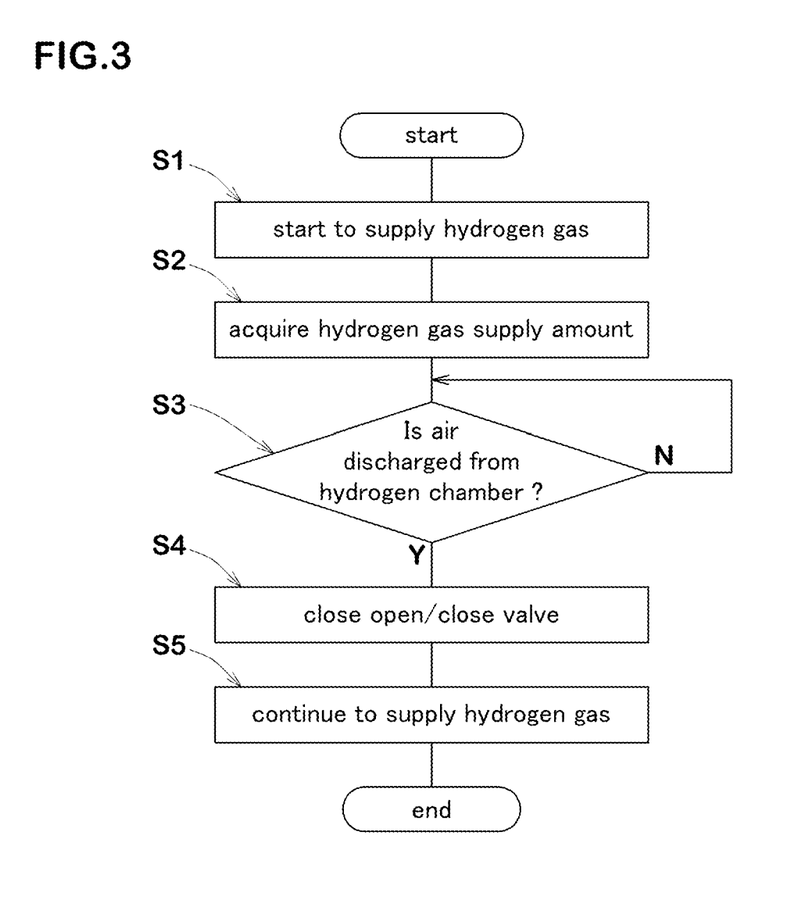
FIG. 3 a flowchart showing the operation of the hydrogen gas dissolving apparatus.

FIG. 3 shows the operation of the hydrogen gas dissolving apparatus 1 at the start of operation.

In the initial state before the start of operation of the hydrogen gas dissolving apparatus 1, the open/close valve 65 is open.

When the hydrogen supply unit 2 starts supplying hydrogen gas (S1), the hydrogen gas dissolution module 6 starts producing hydrogen water. In addition, the discharge of air from the hydrogen chamber 63 is started.

Then, the control unit 10 acquires the amount of the supplied hydrogen (S2).

If the air is completely discharged from the hydrogen chamber 63 (Y in S3), the control unit 10 closes the open/close valve 65 (S4). Thereby, the outflow of hydrogen gas from the hydrogen chamber 63 is suppressed.

In S3, the control unit 10 calculates the remaining amount of the air in the hydrogen chamber 63 based on the amount of the supplied hydrogen. For example, when the amount of the supplied hydrogen exceeds the internal volume of the hydrogen chamber 63, the control unit 10 determines that the air is completely discharged from the hydrogen chamber 63, and shifts to S4.

After that, the hydrogen supply unit 2 continues to supply hydrogen gas (S5). Thereby, the inside of the hydrogen chamber 63 is pressurized, and the permeation of hydrogen gas into the tube bodies 61 is promoted, and the dissolved hydrogen concentration in the hydrogen water is increased.

Figure 4:
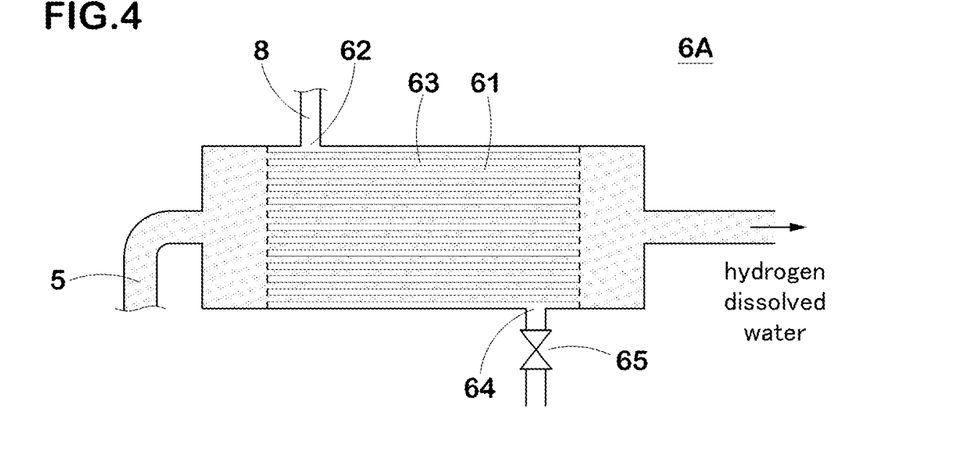
FIG. 4 a diagram showing a modified example of the hydrogen gas dissolution module of the hydrogen gas dissolving apparatus.

FIG. 4 shows a schematic structure of a hydrogen gas dissolution module 6A which is a modification of the hydrogen gas dissolution module 6 shown in FIG. 1.

As to portions of the hydrogen gas dissolution module 6A which are not described below, the structure of the hydrogen gas dissolution module 6 described above can be adopted therefor.

Regarding that the supply port 62 is located above the exhaust port 64, the hydrogen gas dissolution module 6A is different from the hydrogen gas dissolution module 6 in which the supply port 62 and the exhaust port 64 are located at the same height. More specifically, the supply port 62 is positioned in an upper part of the hydrogen chamber 63, and the exhaust port 64 is positioned in a lower part of the hydrogen chamber 63. By providing the supply port 62 above the exhaust port 64, the hydrogen gas supplied from the supply port 62 becomes easy to stay in the upper part of the hydrogen chamber 63, and the air having the density higher than that of the hydrogen gas becomes easy to be discharged through the exhaust port 64. Therefore, the air is easily and quickly discharged through the exhaust port 64. In addition, the outflow of the hydrogen gas from the exhaust port 64 can be suppressed.

Figure 5:
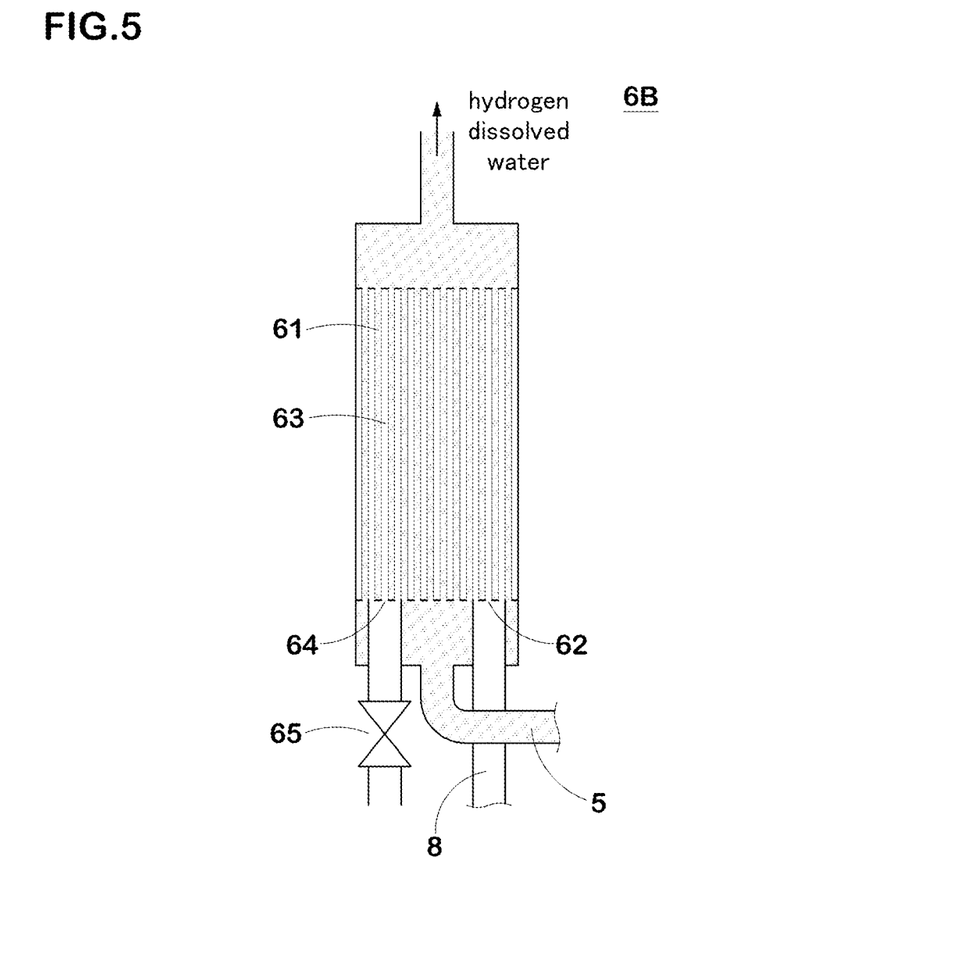
FIG. 5 a diagram showing another modified example of the hydrogen gas dissolution module of the hydrogen gas dissolving apparatus.

FIG. 5 shows a schematic structure of a hydrogen gas dissolution module 6B which is a modification of the hydrogen gas dissolution module 6 shown in FIG. 1. As to portions of the hydrogen gas dissolution module 6B which are not described below, the structures of the hydrogen gas dissolution module 6 and the like described above can be adopted therefor.

Regarding that the tube bodies 61 extend in the vertical direction, the hydrogen gas dissolution module 6B is different from the hydrogen gas dissolution module 6 in which the tube bodies 61 extend in the horizontal direction.

The hydrogen gas dissolution module 6B is mounted in the hydrogen gas dissolving apparatus 1 in an upright posture. That is, the hydrogen gas dissolution module 6B has a vertical-mount type structure.

In the hydrogen gas dissolution module 6B, the tube bodies 61 are supplied with water from the under side, and the produced hydrogen water is taken out from the upper side.

In the hydrogen gas dissolution module 6B, the supply port 62 and the exhaust port 64 are located at the same height. Since the exhaust port 64 is provided in the lower part of the hydrogen chamber 63, air having the density higher than that of the hydrogen gas is smoothly discharged through the exhaust port 64. Thereby, as a result, the air in the hydrogen chamber 63 is quickly discharged, and it becomes possible to quickly increase the dissolved hydrogen concentration.

Figure 6:
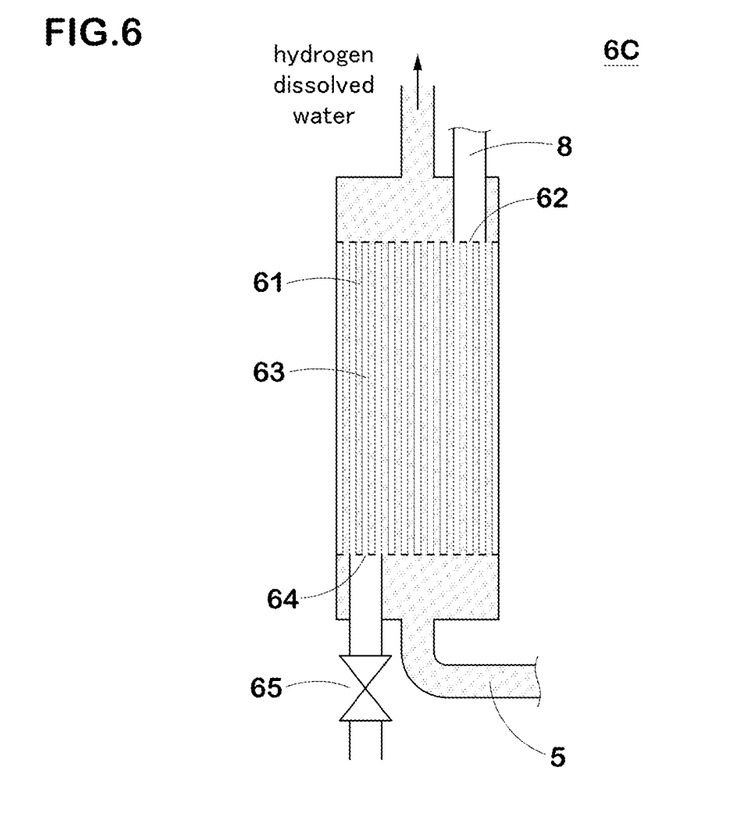
FIG. 6 a diagram showing still another modified example of the hydrogen gas dissolution module of the hydrogen gas dissolving apparatus.

FIG. 6 shows a schematic structure of a hydrogen gas dissolution module 6C which is a modification of the hydrogen gas dissolution module 6B shown in FIG. 5. As to portions of the hydrogen gas dissolution module 6C which are not described below, the structures of the hydrogen gas dissolution module 6B described above can be adopted therefor.

Regarding that the supply port 62 is located above the exhaust port 64, the hydrogen gas dissolution module 6C is different from the hydrogen gas dissolution module 6B in which the supply port 62 and the exhaust port 64 are located at the same height. More specifically, the supply port 62 is disposed in an upper part of the hydrogen chamber 63, and the exhaust port 64 is disposed in a lower part of the hydrogen chamber 63. Since the supply port 62 is located above the exhaust port 64, the hydrogen gas supplied from the supply port 62 becomes easy to stay in the upper part of the hydrogen chamber 63, and the air having the density higher than that of the hydrogen gas becomes easy to be discharged through the exhaust port 64. Therefore, the air is easily and quickly discharged through the exhaust port 64. In addition, the outflow of the hydrogen gas from the exhaust port 64 can be suppressed.

Further, it may be possible to adopt a hydrogen gas dissolution module in which the features of the hydrogen gas dissolution modules 6, 6A, 6B and 6C are combined.

Figure 7:
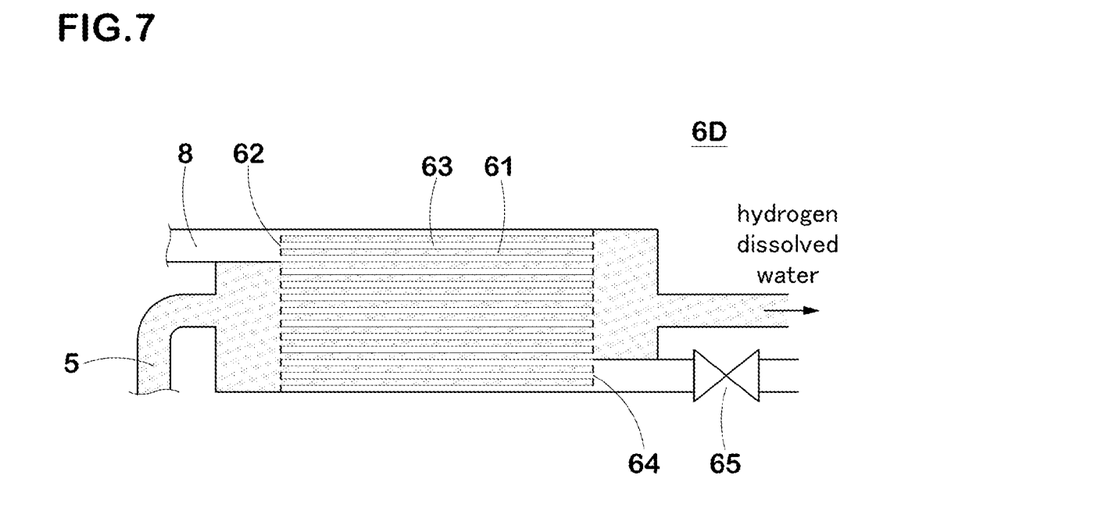
FIG. 7 a diagram showing still another modified example of the hydrogen gas dissolution module of the hydrogen gas dissolving apparatus.
Figure 8:
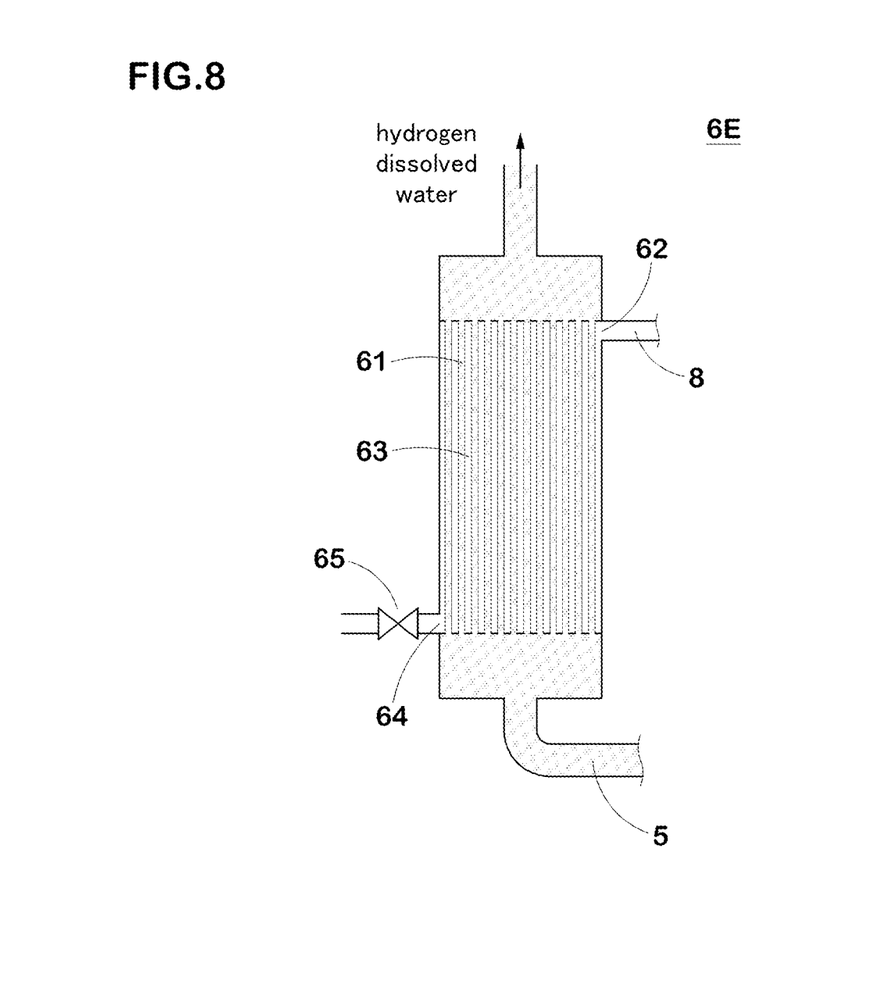
FIG. 8 a diagram showing still another modified example of the hydrogen gas dissolution module of the hydrogen gas dissolving apparatus.

For instance, FIG. 7 shows a hydrogen gas dissolution module 6D in which the configuration of the supply port 62 and the exhaust port 64 shown in FIG. 6 is applied to the hydrogen gas dissolution module 6A of the horizontal-mount type of FIG. 4. Further, FIG. 8 shows a hydrogen gas dissolution module 6E in which the configuration of the supply port 62 and the exhaust port 64 shown in FIG. 4 is applied to the hydrogen gas dissolution module 6C of the vertical-mount type of FIG. 6.

Even in the hydrogen gas dissolution module 6D and the hydrogen gas dissolution module 6E, since the exhaust port 64 is located in the lower part of the hydrogen chamber 63, the air in the hydrogen chamber 63 is quickly discharged. Further, as the supply port 62 is located above the exhaust port 64, the exhaust of the air is further promoted.

While the hydrogen gas dissolving apparatus 1 of the present invention has been described in detail above, the present invention can be embodied in various forms without being limited to the illustrated embodiment. That is, it is enough that the hydrogen gas dissolving apparatus 1 at least has the hydrogen supply unit 2 capable of supplying hydrogen gas, and the hydrogen gas dissolution module 6 for bringing the hydrogen gas supplied from the hydrogen supply unit 2 in contact with and dissolved in water, wherein the hydrogen gas dissolution module 6 has the supply port 62 to which the hydrogen gas is supplied, the hydrogen chamber 63 communicating with the supply port 62, and filled with the hydrogen gas supplied from the supply port 62, and the exhaust port 64 communicating with the hydrogen chamber 63, and discharging the air in the hydrogen chamber 63, and wherein the exhaust port 64 is located in the lower part of the hydrogen chamber 63.

DESCRIPTION OF REFERENCE SIGNS

1: hydrogen gas dissolving apparatus
2: hydrogen supply unit
6: hydrogen gas dissolution module
6A: hydrogen gas dissolution module
6B: hydrogen gas dissolution module
6C: hydrogen gas dissolution module
6D: hydrogen gas dissolution module
6E: hydrogen gas dissolution module
10: control unit
61: tube body
62: supply port
63: hydrogen chamber
64: exhaust port
65: open/close valve

The invention claimed is:

1. A hydrogen gas dissolving apparatus comprising a hydrogen supply unit capable of supplying hydrogen gas, and a hydrogen gas dissolution module for making the hydrogen gas supplied from the hydrogen supply unit being contact with and dissolved in water,
wherein
the hydrogen gas dissolution module comprises a supply port to which the hydrogen gas is supplied, a hydrogen chamber communicating with the supply port and filled with the hydrogen gas supplied from the supply port, and an exhaust port communicating with the hydrogen chamber, the exhaust port is for discharging air which fills the hydrogen chamber before the hydrogen gas is supplied from the supply port, the exhaust port is located in a lower part of the hydrogen chamber, and below the exhaust port, an open/close valve controlled by a control unit is provided, wherein the control unit controls the open/close valve such that in an initial state before a start of operation of the hydrogen gas dissolving apparatus, the control unit lets the open/close valve opened, whereby, when the hydrogen supply unit starts to supply the hydrogen gas so that the hydrogen gas dissolution module starts to produce hydrogen water, the air in the hydrogen chamber is moved down by the supplied hydrogen gas and discharged through the exhaust port and the opened open/close valve, and when the amount of the hydrogen gas supplied to the hydrogen chamber exceeds the internal volume of the hydrogen chamber, the control unit determines that the air is completely discharged from the hydrogen chamber, and the control unit closes the open/close valve, wherein after the open/close valve is closed by the control unit, the hydrogen supply unit continues to supply the hydrogen gas to pressurize the inside of the hydrogen chamber.

2. The hydrogen gas dissolving apparatus according to claim 1, wherein the supply port is located above the exhaust port.

3. The hydrogen gas dissolving apparatus according to claim 1, wherein the hydrogen gas dissolution module has a plurality of the tube bodies for passing water, and the tube bodies are composed of a porous membrane that allows the hydrogen gas to permeate.

4. The hydrogen gas dissolving apparatus according to claim 3, wherein the tube bodies are arranged in a direction intersecting the traveling direction of the hydrogen gas supplied from the supply port to the hydrogen chamber.

5. The hydrogen gas dissolving apparatus according to claim 3, wherein the porous membrane is a hollow fiber membrane.

6. The hydrogen gas dissolving apparatus according claim 2, wherein the hydrogen gas dissolution module has a plurality of the tube bodies for passing water, and the tube bodies are composed of a porous membrane that allows the hydrogen gas to permeate.

7. The hydrogen gas dissolving apparatus according to claim 4, wherein the porous membrane is a hollow fiber membrane.

* * * * *